United States Patent
Allison et al.

(10) Patent No.: US 7,092,505 B2
(45) Date of Patent: Aug. 15, 2006

(54) METHODS AND SYSTEMS FOR UNIVERSAL, AUTOMATIC SERVICE SELECTION IN A TELECOMMUNICATIONS SIGNALING NETWORK

(75) Inventors: Rick L. Allison, Cary, NC (US); Raghavendra G. Rao, Cary, NC (US); Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 301 days.

(21) Appl. No.: 10/631,586

(22) Filed: Jul. 31, 2003

(65) Prior Publication Data

US 2004/0081206 A1 Apr. 29, 2004

Related U.S. Application Data

(63) Continuation-in-part of application No. 09/759,743, filed on Jan. 12, 2001, now Pat. No. 6,662,017, which is a continuation-in-part of application No. 09/471,946, filed on Dec. 23, 1999, now Pat. No. 6,836,477, and a continuation-in-part of application No. 09/747,070, filed on Dec. 22, 2000, now Pat. No. 7,035,239, which is a continuation-in-part of application No. 09/471,946, filed on Dec. 23, 1999, now Pat. No. 6,836,477.

(60) Provisional application No. 60/177,523, filed on Jan. 21, 2000.

(51) Int. Cl.
*H04M 7/00* (2006.01)
*H04L 12/66* (2006.01)
*H04J 3/16* (2006.01)
*H04J 3/22* (2006.01)

(52) U.S. Cl. .................. 379/229; 370/352; 370/469

(58) Field of Classification Search ................ 370/389, 370/392, 467, 335, 342, 352, 469, 522; 379/221.08–221.12, 220.01, 219, 229, 230; 719/310, 313
See application file for complete search history.

(56) References Cited

U.S. PATENT DOCUMENTS 4,310,727 A 1/1982 Lawser (Continued)

FOREIGN PATENT DOCUMENTS

EP 0 512 962 A2 11/1992

(Continued)

OTHER PUBLICATIONS

Rockhold, "Or," Wireless Review, pp. 22, 23, 26, 28, 30, 32 (Aug. 15, 2000).

(Continued)

*Primary Examiner*—Benny Quoc Tieu
(74) *Attorney, Agent, or Firm*—Jenkins, Wilson, Taylor & Hunt, P.A.

(57) ABSTRACT

Methods and systems for universal, automatic service selection are disclosed. A method for universal, automatic service selection includes receiving signaling messages and identifying signaling connection control part (SCCP) messages from the signaling messages. The SCCP messages are decoded to extract SCCP parameters and application layer parameters from the messages. A routing address translation service is selected for each of the SCCP messages based on application identifiers that identify application layer message types alone or in combination with other parameters. Selecting the routing address translation service in this manner makes the service selection more robust and universally applicable, especially in networks where different or non-standard selector parameters are utilized.

54 Claims, 7 Drawing Sheets

U.S. PATENT DOCUMENTS

| | | | |
|---|---|---|---|
| 4,754,479 A | | 6/1988 | Bicknell et al. |
| 5,089,954 A | * | 2/1992 | Rago .......................... 707/10 |
| 5,237,604 A | | 8/1993 | Ryan |
| 5,247,571 A | | 9/1993 | Kay et al. |
| 5,251,248 A | | 10/1993 | Tokunaga et al. |
| 5,400,390 A | | 3/1995 | Salin |
| 5,422,941 A | | 6/1995 | Hasenauer et al. |
| 5,423,068 A | | 6/1995 | Hecker |
| 5,430,719 A | * | 7/1995 | Weisser, Jr. ................. 370/389 |
| 5,442,683 A | | 8/1995 | Hoogeveen |
| 5,455,855 A | | 10/1995 | Hokari |
| 5,457,736 A | | 10/1995 | Cain et al. |
| 5,481,603 A | | 1/1996 | Gutierrez et al. |
| 5,502,726 A | * | 3/1996 | Fischer ....................... 370/392 |
| 5,504,804 A | | 4/1996 | Widmark et al. |
| 5,526,400 A | | 6/1996 | Nguyen |
| 5,579,372 A | | 11/1996 | Åström |
| 5,590,398 A | | 12/1996 | Matthews |
| 5,594,942 A | | 1/1997 | Antic et al. |
| 5,623,532 A | | 4/1997 | Houde et al. |
| 5,689,548 A | | 11/1997 | Maupin et al. |
| 5,706,286 A | | 1/1998 | Reiman et al. |
| 5,711,002 A | | 1/1998 | Foti |
| 5,819,178 A | | 10/1998 | Cropper |
| 5,832,382 A | | 11/1998 | Alperovich |
| 5,854,982 A | | 12/1998 | Chambers et al. |
| 5,878,347 A | | 3/1999 | Joensuu et al. |
| 5,890,063 A | | 3/1999 | Mills |
| 5,953,662 A | | 9/1999 | Lindquist et al. |
| 5,953,663 A | | 9/1999 | Maupin et al. |
| 5,983,217 A | * | 11/1999 | Khosravi-Sichani et al. ... 707/3 |
| 6,006,098 A | | 12/1999 | Rathnasabapathy et al. |
| 6,011,803 A | * | 1/2000 | Bicknell et al. ............ 370/467 |
| 6,014,557 A | * | 1/2000 | Morton et al. .............. 455/410 |
| 6,049,714 A | | 4/2000 | Patel |
| 6,097,960 A | | 8/2000 | Rathnasabapathy et al. |
| 6,115,463 A | | 9/2000 | Coulombe et al. |
| H1895 H | * | 10/2000 | Hoffpauir et al. ........... 455/433 |
| 6,128,377 A | | 10/2000 | Sonnenberg |
| 6,137,806 A | * | 10/2000 | Martinez ..................... 370/428 |
| 6,138,016 A | | 10/2000 | Kulkarni et al. |
| 6,138,023 A | | 10/2000 | Agarwal et al. |
| 6,144,857 A | | 11/2000 | Price et al. |
| 6,148,204 A | | 11/2000 | Urs et al. |
| 6,192,242 B1 | | 2/2001 | Rollender |
| 6,226,517 B1 | | 5/2001 | Britt et al. |
| 6,411,632 B1 | | 6/2002 | Lindgren et al. |
| 6,424,832 B1 | | 7/2002 | Britt et al. |
| 6,535,746 B1 | | 3/2003 | Yu et al. |
| 6,574,481 B1 | | 6/2003 | Rathnasabapathy et al. |
| 6,577,723 B1 | | 6/2003 | Mooney |
| 6,594,258 B1 | | 7/2003 | Larson et al. |
| 6,683,881 B1 | * | 1/2004 | Mijares et al. .............. 370/401 |
| 6,950,441 B1 | * | 9/2005 | Kaczmarczyk et al. ..... 370/467 |

FOREIGN PATENT DOCUMENTS

| | | |
|---|---|---|
| EP | 0 944 276 A1 | 9/1999 |
| WO | 95/12292 | 5/1995 |
| WO | 96/11557 | 4/1996 |
| WO | 97/33441 | 9/1997 |
| WO | 99/11087 | 3/1999 |
| WO | 00/16583 | 3/2000 |

OTHER PUBLICATIONS

ETSI, "Digital Cellular Telecommunications Systems (Phase 2 ++); Support of Mobile Number Portability (MNP); Technical Realisation; Stage 2," Global System for Mobile Communications, pp. 1-71 (1998).

Smith, "Number Portability Pileup," *Telephony*, pp. 22, 24, 26 (Jan. 6, 1997).

Jain et al., "Phone Number Portability for PCS Systems with ATM Backbones Using Distributed Dynamic Hashing," IEEE, vol. 15, No. 1, pp. 96-105 (Jan. 1997).

Heinmiller, "Generic Requirements for SCP Application and GTT Function for Number Portability," Illinois Number Portability Workshop, Issue No. 0.95, Final Draft, pp. 1-50 (Sep. 4, 1996).

International Telecommunication Union, "Series Q: Switching and Signalling; Specifications of Signalling System No. 7 —Signalling Connection Control Part," pp. 11-16 (Jul. 1996).

Rice, "SS7 Networks in a PCS World," *Telephony*, pp. 138, 140, 142, 146 (Jun 24, 1996).

Tekelec, "EAGLE® STP Planning Guide," pp. l-vii, 1-64, A1-B2 (May, 1996).

Anonymous entitled "Generic Switching and Signaling Requirements for Number Portability," AT&T Network Systems, Issue 1, pp. 1-75 (Feb. 2, 1996).

Jain et al., entitled "A Hashing Scheme for Phone Number Portability in PCS Systems with ATM Backbones," Bell Communications Research, pp. 593-597 (1996).

ETSI, "Digital Cellular Telecommunications System (Phase 2+); Mobile Application Part (MAP) Specification," Global System for Mobile Communications, pp. 112-114 (1996).

Bishop, "Freeing the Network Competition," Telecommunications, vol. 29, No. 4, pp. 75-80 (Apr. 1995).

Giordano et al., "PCS Number Portability," IEEE, pp. 1146-1150 (Sep. 1994).

Bellcore, "Signaling Transfer Point (STP) Generic Requirements," Bell Communications Research, Issue 1, pp. li-xxii, 4-84—J14, (Jun. 1994).

Telcordia Technologies, "CCS Network Interface Specification (CCSNIS) Supporting SCCP and TCAP," Bell Communications Research, Issue 1, pp. li-xii, 1-1—3-6, A-1—C22, (Mar. 1994).

Buckles, Very High Capacity Signaling Transfer Point for Intelligent Network Services DSC Communications Corporation, pp. 1308-1311 (1988).

* cited by examiner

METHODS AND SYSTEMS FOR UNIVERSAL, AUTOMATIC SERVICE SELECTION IN A TELECOMMUNICATIONS SIGNALING NETWORK

RELATED APPLICATIONS

This application is a continuation-in-part of 1) U.S. patent application Ser. No. 09/759,743, filed Jan. 12, 2001, now U.S. Pat. No. 6,662,017, which is a continuation-in-part of U.S. patent application Ser. No. 09/471,946 filed Dec. 23, 1999, now U.S. Pat. No. 6,836,477 and which further claims the benefit of U.S. Provisional Patent Application No. 60/177,523 filed Jan. 21, 2000, and 2) U.S. patent application Ser. No. 09/747,070, filed Dec. 22, 2000, now U.S. Pat. No. 7,035,239, which is also a continuation-in-part of U.S. patent application Ser. No. 09/471,946 filed Dec. 23, 1999, now U.S. Pat. No. 6,836,477, the disclosures of each of which are incorporated herein by reference in their entirety.

TECHNICAL FIELD

The present invention relates to methods and systems for providing routing address translation service selection in a communications network. More particularly, the present invention relates to methods and systems for universal, automatic routing address translation service selection in a telecommunications signaling network.

BACKGROUND ART

In the modern public switched telephone network (PSTN) and wireless telecommunication networks, an out-of-band common channel signaling (CCS) network is employed to facilitate the setup and tear down of voice and/or data communication sessions between telephone service subscribers. This signaling network is typically referred to as the signaling system 7 (SS7) network. The SS7 network utilizes a number of different signaling messages to perform call setup, call tear down, and database services. These signaling messages include ISDN user part (ISUP) messages for PSTN call setup and tear down, transaction capabilities application part (TCAP) messages for accessing database services, mobile application part (MAP) messages for providing mobile communications services, and signaling connection control part (SCCP) messages for carrying TCAP and MAP messages.

It is often the case within a signaling network that signaling messages require intermediate routing address translation prior to reaching their final destinations. The most common example of such intermediate routing address translation is referred to in the telecommunications industry as global title translation (GTT). GTT is defined in *Telcordia Technologies Specification of Signalling System Number 7 Number*, GR-246-CORE, Issue 07, Dec. 2, 2002 (hereinafter, "GR-246-CORE"), the disclosure of which is incorporated herein by reference in its entirety. As defined in GR-246-CORE, GTT provides network elements, such as wireline and wireless end office nodes (e.g., CLASS 5 switches, mobile switching centers, etc.), with the ability to send SCCP messages, such as SCCP messages carrying 800 number service queries, calling name (CNAM) delivery service queries, home location register (HLR) queries, short message service (SMS) messages, etc., into a signaling network without knowledge of the point code and subsystem number of the network entity that can provide the necessary service. In typical GTT processing, a global title address value is extracted from the SCCP called party address field of a message and is translated into a destination point code and subsystem number.

Within a signaling network, GTT processing may be performed by a service control point (SCP) or by a network routing node, such as a signal transfer point (STP) or Internet-protocol-capable signaling gateway (SG). Given the wide variety of services that may be concurrently supported by a signaling network, routing address translation data and applications may be separated according to service type. For example, one routing address translation application may translate HLR queries, while another routing address translation application may translate CNAM queries. Thus, one problem with performing routing address translations is determining which service or type of routing address translation processing is appropriate and where the appropriate routing address translation service can be obtained. Once again, routing address translation services may be provisioned on SCPs or STPs. In the former case, service selection may include identifying an SS7 point code and subsystem number associated with an SCP node that will perform the routing address translation. In the latter case, service selection may involve identifying a routing address translation data set and the logical or physical location of the translation data set within the network routing node.

In conventional service selection in ANSI networks, an SCCP parameter referred to as translation type (TT) is used to select the block of global title translation data associated with a particular service. For example, one translation type value may indicate a block of data for wireline number portably translations. Another translation type value may indicate the location of global title translation data for calling name translations. Yet another translation type may indicate the location of global title translation data for mobile communications services.

FIG. 1 illustrates an exemplary signaling network 100 where the TT is used to select a routing address translation service. In FIG. 1, signaling network 100 includes a mobile switching center (MSC) 102, an STP 104, a number portability (NP) SCP 106, a CNAM SCP 108, a pair of HLR SCP nodes 110 and 112, and an SMS Center (SMSC) SCP 114. In this example, it is assumed that STP 104 performs routing address translations and that STP 104 has separate blocks of routing address of translation data and/or separate applications to perform routing address translations for number portability service, CNAM service, HLR service, and SMS service.

In FIG. 1, a CNAM query message is originated by MSC 102 and routed to STP 104. STP 104 examines the TT parameter contained in the SCCP portion of the CNAM query message. Based on the TT, STP 104 selects a particular type or set of routing address translation data for use in translating the received signaling message. In this example, STP 104 selects the routing address translation data set for CNAM service. Once a routing address translation data set is selected, STP 104 uses global title address information contained in the message to perform a lookup in the CNAM routing address translation data set and extract the point code and subsystem number of CNAM SCP 108. The message is then routed to CNAM SCP 108 based on the extracted point code and subsystem number. CNAM SCP 108 may then provide calling name service for the query message.

In the network illustrated in FIG. 1, using the TT alone or in combination with other SCCP parameters to select a routing address translation service may work effectively provided that the operator of the network provisions the appropriate TT and other SCCP parameter values in STP 104. However, since some messages that arrive in network 100 may not originate from network 100, such messages may not have the same SCCP service selection parameter values used in network 100 because the service providers in the originating networks may use different SCCP parameter values to identify routing address translation services. In addition, some network operators may ignore one or more of the conventional SCCP parameter values used by other operators to indicate a routing address translation service type. Thus, service selection based solely on SCCP parameters fails to provide a universal service selection solution.

U.S. Pat. No. 6,577,723 discloses a system for using the TCAP protocol type, i.e., whether the message is ANSI TCAP or ITU TCAP, in order to determine how to process the SCCP portion of the message. The TCAP protocol type is determined by analyzing the first two bits in the TCAP portion of the message. Using the TCAP protocol type to control processing of an SCCP message allows SCCP messages that carry ANSI TCAP messages to be processed differently from SCCP messages that carry ITU TCAP messages. However, the TCAP protocol type does not indicate the application layer message type being carried by the TCAP message. In addition, ITU application layer messages can be carried by ANSI TCAP messages and ANSI application layer messages can be carried by ITU TCAP messages. Thus, selecting SCCP processing based on the TCAP protocol type fails to yield a universally applicable solution for service selection.

Accordingly, there exists a long felt need for improved methods and systems for universal, automatic service selection in a telecommunications signaling network.

DISCLOSURE OF INVENTION

The present invention includes methods and systems for universal, automatic service selection. In one exemplary implementation, the present invention performs universal, automatic service selection based on an application identifier in a message. As used herein, the term "application identifier" refers to a parameter in a message that identifies the application layer message type. The term "application layer," as used herein, refers to the layer at the destination responsible for terminating and processing a message. In SS7 networks, an example of an application layer is the mobile application part (MAP) layer. An example of an application identifier for the MAP layer is the TCAP opcode, which identifies the MAP message type. In SS7 over IP networks, application identifiers may be selected from SIGTRAN protocol layers used to carry application layer messages. In IP telephony signaling networks, examples of application layers include session initiation protocol layers, short message delivery point to point layers, and H.323 layers. The application identifiers for these layers may be parameters within the application layers or in lower layers used to carry the application layers.

In performing universal, automatic service selection, an STP may receive a signaling message requiring a routing address translation. In order to select the proper set of routing address translation data, the STP may decode an application identifier from the message. The application identifier may be used alone or combination with other parameters to select the appropriate routing address translation service. For example, the application identifier may be used in combination with any of the SCCP parameters mentioned above, including the translation type.

Using an application identifier that identifies an application layer message type to select the appropriate routing address translation service increases the likelihood that the message will be translated correctly and sent to the appropriate service providing node. For example, the opcodes used to indicate MAP message types are standardized. As a result, network operators use the same opcodes to identify the same message types. Thus, using an application to select the appropriate routing address translation service in these networks provides a more robust solution than using conventional SCCP selection parameters alone.

As used herein, the term "routing address translation" refers to translation of a parameter in a message into a routable destination address. In SS7 networks, one example of a routing address translation is GTT, which translates a called party address into a point code and subsystem number. Another example of a routing address translation includes a local number portability translation where the dialed digits in a message are translated into the LRN of an end office associated with the recipient exchange. The term "service selection" refers to processing for selecting the appropriate type of routing address translation service. For example, service selection may include identifying a global title translation application and/or data set to be used for processing a received message.

Accordingly, it is an object of the invention to provide methods and systems for universal, automatic service selection.

It is another object of the invention to provide methods and systems for service selection that do not rely solely on conventional SCCP selector parameters and/or the TCAP protocol type.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
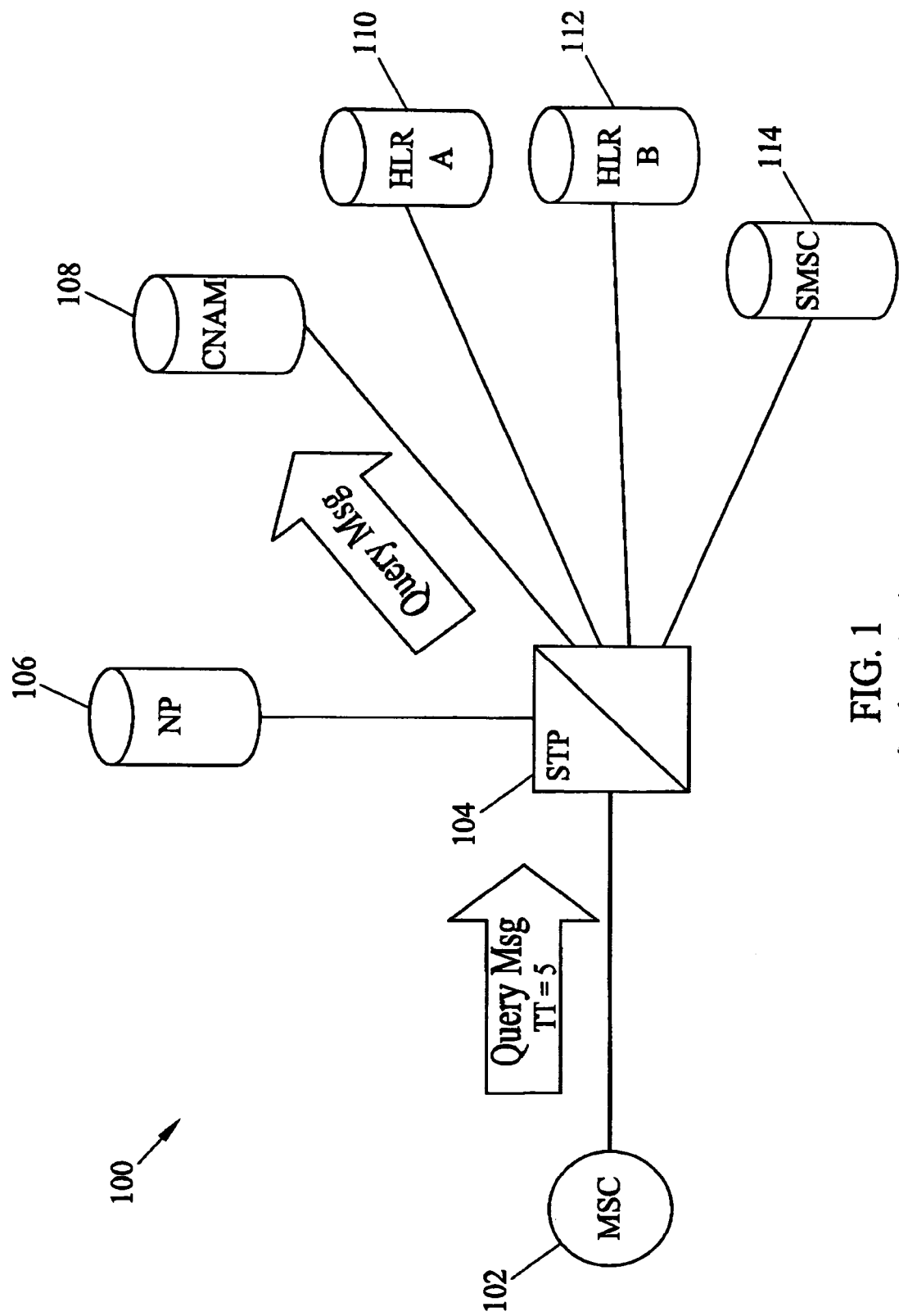
FIG. 1 is a network diagram that illustrates conventional routing address translation processing at a signal transfer point based on the SCCP translation type parameter.
Figure 2:
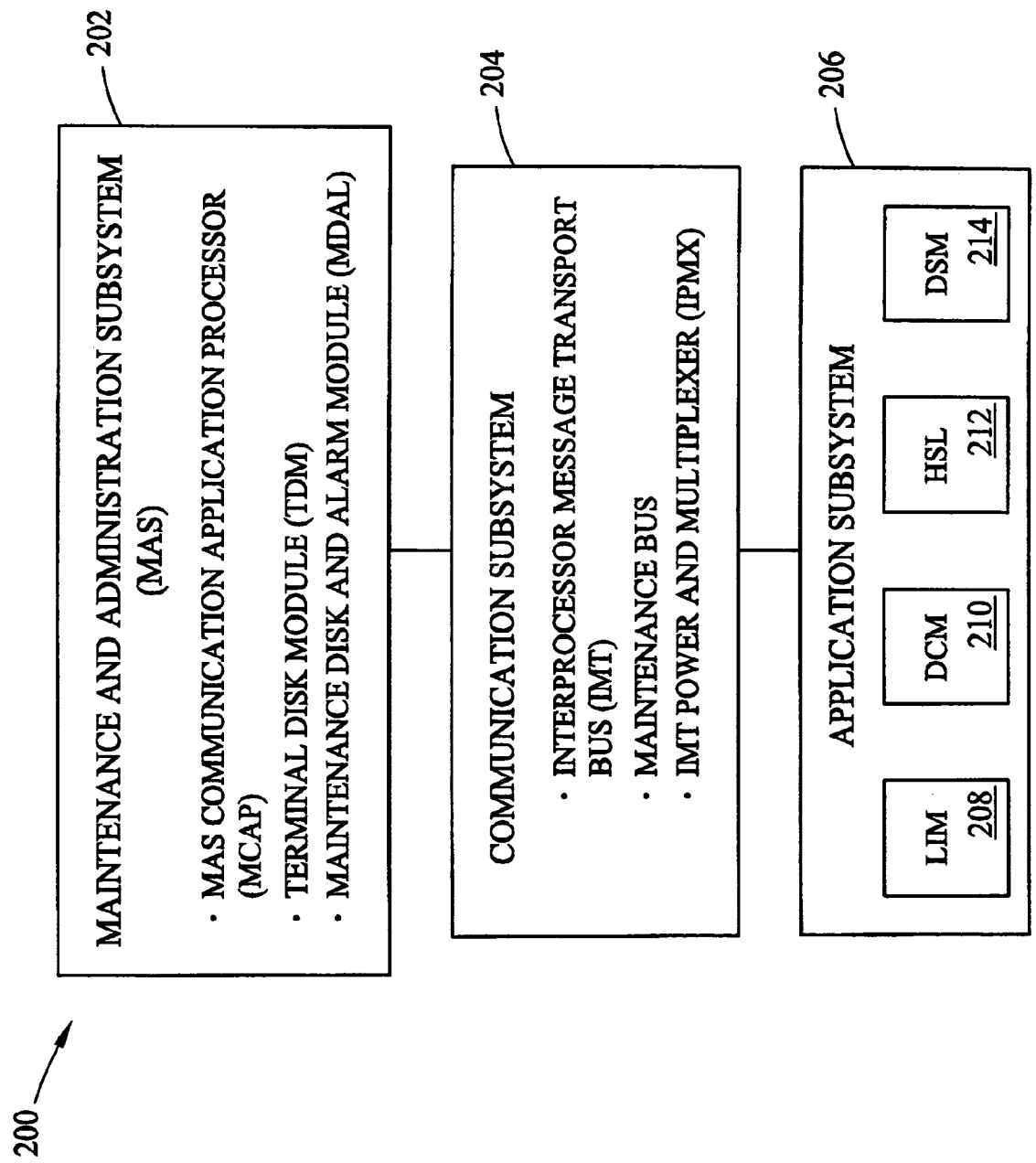
FIG. 2 is a block diagram illustrating an exemplary architecture of a signaling gateway (SG) routing node suitable for use with embodiments of the present invention.

Disclosed herein are several embodiments of the present invention, which may include an underlying hardware platform similar to that of a signal transfer point (STP) or an SS7-over-Internet protocol signaling gateway. FIG. 2 is a block diagram illustrating an exemplary SG node 200, which employs a distributed, multi-processor system architecture suitable for use with embodiments of the present invention. As shown in FIG. 2, SG 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus that is the main communication bus or network. The IMT bus facilitates communication among the various modules and subsystems that comprise the SG. In one embodiment, the IMT bus includes two 1 Gbps counter-rotating serial rings. In an alternate embodiment, communication subsystem 204 may include a local area network, such as an Ethernet, for connecting the modules in SG 200.

Application subsystem 206 includes application cards or printed circuit boards capable of communicating with the other cards through the IMT communications bus or network. Numerous types of application cards can be included in SG 200. Exemplary application cards include an SS7 link interface module (LIM) 208 that provides SS7 links and X.25 links, a data communication module (DCM) 210 that provides an Internet protocol (IP) signaling interface to external nodes, and a high-speed asynchronous transfer mode (ATM) communication link module (HSL) 212. An application or database service module (DSM) 214 may host one or more signaling message processing applications, such as global title translation for different applications, number portability translation, call screening, pre-paid calling service, mobile services (e.g., home location register, short message service center, mobile authentication center, equipment identity register, or location-based service), 800 number service, caller identification service, and other applications that involve routing or application layer signaling message processing.

The architecture illustrated in FIG. 2 may be used to implement the universal, automatic service selection algorithms of the present invention for signaling connection control part messages as well as IP-encapsulated SCCP signaling messages, such as Internet Engineering Task Force (IETF) SIGTRAN SCCP user adaptation (SUA) protocol messages. Any number of protocol payloads may be transported by such SCCP and encapsulated SCCP signaling messages. These payloads include TCAP messages, operations, maintenance, and administration part (OMAP) messages, and intelligent network (IN) service messages, such as intelligent network application part (INAP) messages. TCAP and INAP messages may carry application layer messages, such as MAP messages or IN service messages.

Figure 3:
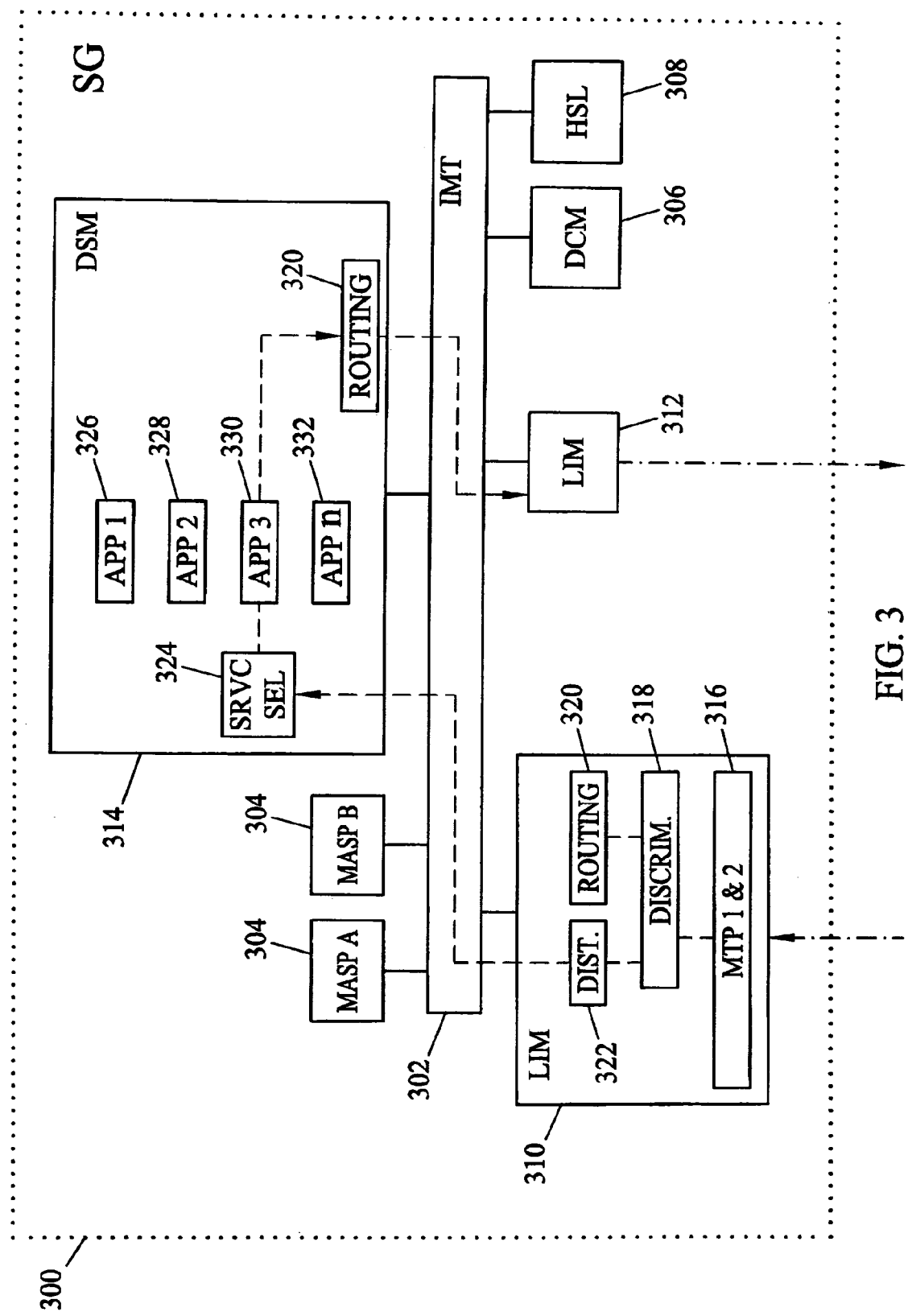
FIG. 3 is a system diagram of a routing node including a database services module for performing universal, automatic service selection according to an embodiment of the present invention.

FIG. 3 illustrates an SG routing node 300 including a service selection function located on a database services module according to an embodiment of the present invention. In FIG. 3, SG routing node 300 includes a high speed IMT communications bus 302 and a pair of MASP processor modules 304. MASP pair 304 implement the maintenance and administration subsystem functions described above. As MASP pair 304 are not essential to a discussion of the universal, automatic service selection of the present invention, a detailed discussion of their function is not provided herein. IMT bus 302 may be a counter-rotating dual ring bus or an Ethernet, as described above.

A number of distributed processing communication and application modules or cards may be coupled to IMT bus 302. In FIG. 3, these processing modules or cards include an IP-capable DCM 306, an ATM-capable HSL communication module 308, a pair of SS7 LIMs 310 and 312, and a DSM 314. Each LIM may be connected to other signaling points in a network via one or more individual SS7 signaling links, where an SS7 signaling link is typically a 56 kbps or 64 kbps DS-0 link. Multiple signaling links connected to a common destination may be "grouped" into a virtual entity known as an SS7 signaling linkset. DCM 306 may be connected to external nodes via one or more IP-based signaling linksets.

As illustrated in FIG. 3, LIM 310 includes an SS7 MTP level 1 & 2 function 316, a message discrimination function 318, a routing function 320 and a message distribution function 322. MTP level 1 and 2 function 316 provides the facilities necessary to send and receive digital data over a particular physical medium, as well as to provide error detection, error correction and sequenced delivery of SS7 messages. Message discrimination function 318 receives signaling messages from the lower processing layers and performs a discrimination function that determines whether an incoming SS7 message requires internal processing or is simply to be through switched. Examples of received SS7 messages that require internal processing include SCCP messages requiring global title translation, messages requiring number portability (NP) translation, signaling network management messages, and messages requiring other application services.

For received signaling messages that require MTP routing, routing function 320 is responsible for examining these messages and determining on which outbound signaling link or IP signaling link equivalent these messages are to be transmitted. Routing function 320 may transmit the messages to the outbound communication module (e.g., the LIM, the DCM, or HSL) associated with the selected signaling link via IMT bus 302.

If discrimination function 318 determines that a received signaling message requires processing by an internal application processor or subsystem of SG node 300, then the message is passed to message distribution function 320. In the embodiment illustrated in FIG. 3, message distribution function 320 may direct the signaling message to a database services module. Discrimination function 318 may examine a service indicator (SI) parameter in the received message and determine that the message has been assigned an SI value of 3, which indicates that the message is an SCCP message. As a result, discrimination function 318 may pass the message to distribution function 322. Distribution function 322 may receive such messages from discrimination function 318 and direct the messages a database services module, such as DSM 314, via IMT bus 302. This type of internal distribution of messages within an SG routing node should not be confused with message routing, which refers to selecting an external signaling link over which a received message should be forwarded.

In one embodiment, one or more DSMs in SG 300 may be configured to support one or more routing address translation or resolution services. Examples of such routing address translation or resolution services include local number portability (LNP) service and various types of global title translation service. These types of global title translation service may include conventional GTT service, which involves translating the SCCP called party address into a point code and subsystem number by performing a lookup in a GTT database that includes entries indexed by ranges of global title addresses and by individual global title addresses.

Yet another type of global title translation service that may be provisioned on a DSM is individual subscriber (10 digit) global title translation service for messages directed to HLRs or short message service centers. Yet another type of global title translation service that may be provisioned on a DSM is a combination of individual subscriber global title translation service and range based global title translation service for messages directed to HLRs or short message service centers. Still another type of global title translation service that may be provisioned includes G-Port® service, available from Tekelec of Calabasas, Calif. Briefly, G-Port® service includes responding to requests for routing information for ported-out mobile subscribers on behalf of a donor HLR and relaying messages for ported-in mobile subscribers to a recipient HLR.

In FIG. 3, DSM 314 includes a service selection function 324, a plurality of routing address translation applications 326-332, and a routing function 320. Routing address translation applications 326-332 receive a signaling message, examine one or more parameters contained in the message, and determine a routable destination address (e.g., an SS7 point code, an IP address, or an LRN) for the message. Based on the DPC in the translated message, routing function 320 selects an appropriate outbound signaling linkset or socket connection and transmits the message to a communications module (e.g., a LIM, a DCM, or an HSL module) associated with the selected linkset or socket connection.

The present invention is not limited to the specific architecture illustrated in FIG. 3. Multiple LIMs, DCMs, HSLs, DSMs, and other types of modules may be included without departing from the scope of the invention.

Exemplary Enhanced Service Selection Functionality

Table 1 shown below illustrates exemplary data structures that may be used by service selection function 324 in selecting the appropriate routing address translation service according to one embodiment of the present invention.

TABLE 1

Translation Service Selector Table

| Domain | GTI | Application Identifier | TT | NP | NAI | SSN | Service |
|---|---|---|---|---|---|---|---|
| ANSI | 2 | 0915 | 1 | 7 | 1 | 6 (HLR) | APP1 |
| ANSI | 2 | 0184 | 2 | 3 | 2 | 32 (LNP) | APP2 |
| ITU | 4 | 02 | * | 3 | 2 | 6 (HLR) | APP3 |
| ANSI | 2 | * | 3 | 3 | 2 | 7 (EIR) | APP4 |

In Table 1, the exemplary translation service selector data includes a domain identifier, a global title indicator, an application identifier, a translation type, a numbering plan, a nature of address indicator, and a subsystem number. These parameters may be extracted from the SCCP and/or the TCAP/MAP portions of a message to determine the appropriate service type. Table 1 also includes a service identifier associated with the selected service type. The service identifier identifies the particular routing address translation service that will be performed for the signaling message.

As illustrated in Table 1, one parameter that may be used to select the appropriate routing address translation service is an application identifier. One example of an application identifier is the TCAP opcode. In ANSI SS7 networks, the TCAP opcode is a two-octet parameter located in the TCAP portion of the message used to provide instructions to application entities for processing the message. The two-octet parameter is divided into the operation family and the operation specifier. The operation family includes a seven-bit field that identifies the group or category related to the operation. The remaining bit of the operation family indicates whether or not a response is expected. The second octet of the operation code consists of the operation specifier, which is used to identify the operation being requested of the remote application. Because opcodes are standardized for certain operations or operation message types, these values may be used by routing address translation function 324 to reliably select a routing address translation service for a received signaling message. Because opcodes are standardized for other purposes, service selection based on these or similar parameters is automatic.

One type of opcode that may be used by service selection function 324 to select an appropriate routing address translation application includes opcodes that represent MAP message types. For example, in IS-41 networks, the opcode in a TCAP message that carries a MAP message is coded as private TCAP with a private TCAP specifier that defines the message type of the payload. For IS-41, the operation family is coded as 9, and bit H (the most significant bit) of the operation family is always coded as 0. Table 2 shown below illustrates exemplary private TCAP specifiers that may be used to identify specific MAP IS-41 message types:

TABLE 2

TCAP Opcodes for IS-41 MAP Messages

| Family Name | Private Specifier | Decimal |
|---|---|---|
| IS-41 MAP | not used | 0 |
| IS-41 MAP | HandoffMeasurementRequest | 1 |
| IS-41 MAP | FacilitiesDirective | 2 |
| IS-41 MAP | MobileOnChannel | 3 |
| IS-41 MAP | HandoffBack | 4 |
| IS-41 MAP | FacilitiesRelease | 5 |
| IS-41 MAP | QualificationRequest | 6 |
| IS-41 MAP | QualificationDirective | 7 |
| IS-41 MAP | Blocking | 8 |
| IS-41 MAP | Unblocking | 9 |
| IS-41 MAP | ResetCircuit | 10 |
| IS-41 MAP | TrunkTest | 11 |
| IS-41 MAP | TrunkTestDisconnect | 12 |
| IS-41 MAP | RegistrationNotification | 13 |
| IS-41 MAP | RegistrationCancellation | 14 |
| IS-41 MAP | LocationRequest | 15 |
| IS-41 MAP | RoutingRequest | 16 |
| IS-41 MAP | RemoteFeatureControlRequest | 17 |
| IS-41 MAP | ServiceProfileRequest | 18 |
| IS-41 MAP | ServiceProfileDirective | 19 |
| IS-41 MAP | UnreliableRoamerDataDirective | 20 |
| IS-41 MAP | CallDataRequest | 21 |
| IS-41 MAP | CSSInactive | 22 |
| IS-41 MAP | TransferToNumberRequest | 23 |
| IS-41 MAP | RedirectionRequest | 24 |
| IS-41 MAP | HandoffToThird | 25 |
| IS-41 MAP | FlashRequest | 26 |

Exemplary IS-41 messages in Table 2 that may require special types of routing address translations include registration notification messages, registration cancellation messages, location request messages, and routing request messages. These messages have specific TCAP opcodes as defined in the relevant IS-41 industry standards documents. Accordingly, service selection function 324 may use the TCAP opcode in order to identify the specific IS-41 MAP message type and direct the message to a routing address translation application associated with IS-41 routing address translation service.

GSM MAP also uses the translation capabilities application part to carry MAP messages. Accordingly, the TCAP opcode may be used to select the appropriate routing address translation services for GSM MAP messages. Exemplary GSM MAP opcodes that identify specific GSM MAP message types are defined in Digital Cellular Telecommunications System (Phase 2+); Mobile Application Part (MAP) Specification (3GPP TS 09.02 Version 7.6.0 Release 1998), the disclosure of which is incorporated by reference herein its entirety. One difference between ANSI and GSM opcodes is that GSM opcodes do not include a family identifier and thus consist only of 1 octet or byte of information. For mobile communications services, GSM MAP opcodes that correspond to send routing information messages, update location messages, and send routing information for SMS messages may be used to select a specific type of routing address translation services associated with GSM mobile networks.

In order to simultaneously support universal, automatic service selection for both ANSI and GSM networks, service selection function 324 may determine whether the MAP portion of the message is GSM or IS-41 MAP. This determination may be made by examining the MAP layer itself to determine whether the MAP protocol type is IS-41 or GSM. If a message is IS-41 MAP, service selection function 324 may decode a two octet opcode in the message. For the IS-41 MAP message, service selection function 324 may use data similar to that illustrated above in Table 2 to select the appropriate routing address translation service. If the message is GSM MAP, service selection function 324 may decode a one-octet opcode and use GSM MAP opcodes to select the service type. Thus, by identifying the appropriate message type, the universal, automatic service selection function of the present invention is capable of universal, automatic service selection in multiple different types of networks.

It is understood that although the translation type is listed as one of the selector parameters in Table 1, service selection function 324 may omit the translation type or any of the other SCCP parameters in Table 1 without departing from the scope of the invention. As indicated above, even though SS7 industry standards recommend the use of the translation type parameter for global title translation, many operators either ignore the translation type or associate the translation types with non-standard global title translation services. By using different combinations of parameters, in addition to or other than the translation type, the present invention provides a service selection function that is universally applicable to different networks. In addition, because the service selection may be based on an application identifier that identifies the application layer message type, and application layer message types are standardized, the universal, automatic service selection function of the present invention is more robust than conventional service selection functions that rely solely on SCCP parameters and/or the TCAP protocol type.

Figure 4:
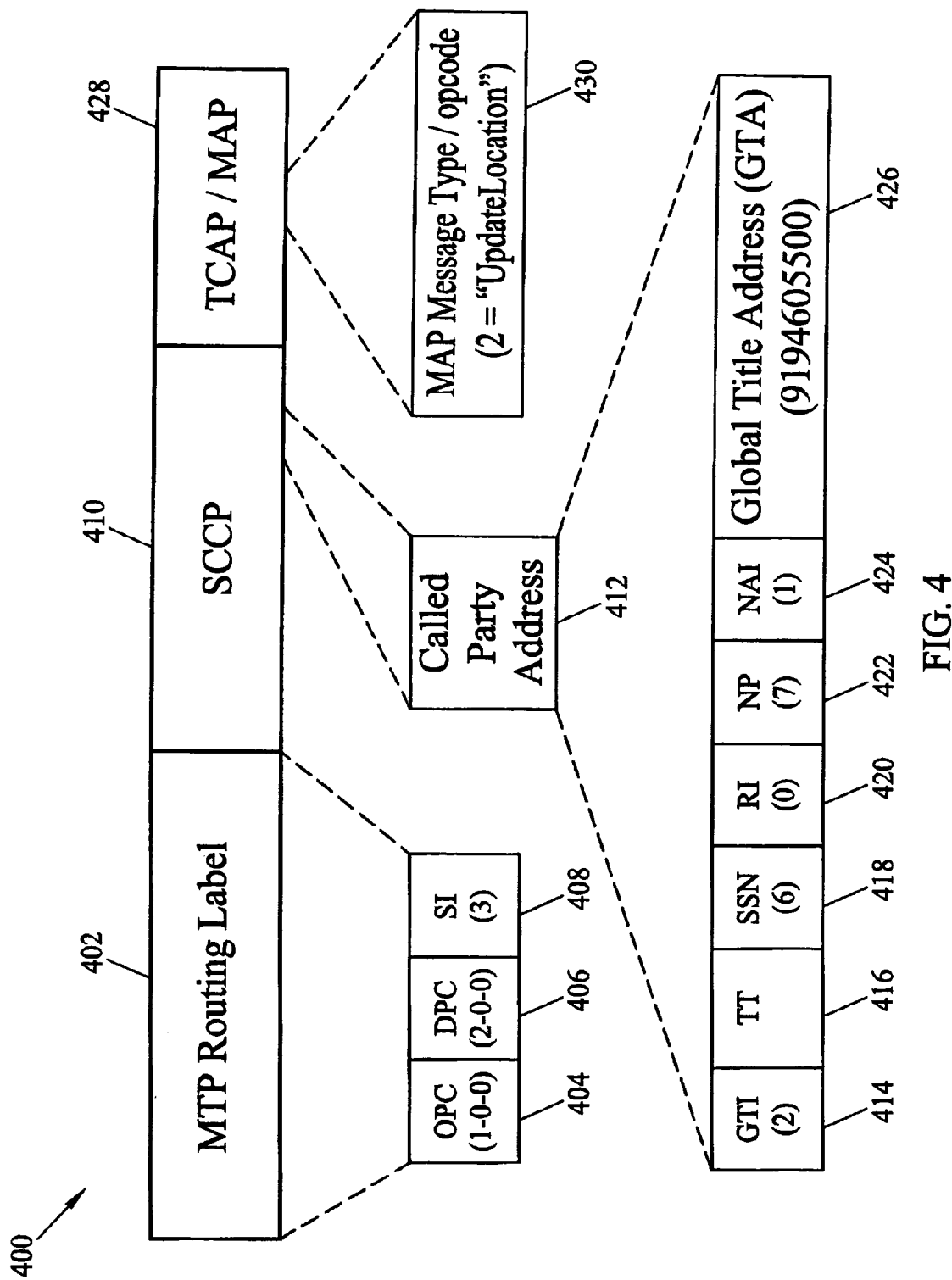
FIG. 4 is a block diagram of an SCCP message.

FIG. 4 illustrates an SCCP message including exemplary parameters that may be used by service selection function 324 in performing a lookup in Table 1. In FIG. 4, an SCCP message 400 includes a TCAP payload for invoking remote MAP operations. SCCP message 400 also includes an SS7 message transfer part (MTP) routing label 402 that includes an SS7 originating point code (OPC) address 404, an SS7 destination point code (DPC) parameter 406, and a service indicator (SI) parameter 408. Message 400 further includes an SCCP component 410, which includes a called party address 412. SCCP called party address 412 may include a GTI parameter 414, a TT parameter 416, an SSN parameter 418, a routing indicator (RI) 420, an NP parameter 422, an NAI parameter 424, and a global title address (GTA) 426. A TCAP layer 428 is also contained in message 400. In this example, TCAP layer 428 includes an opcode parameter 430 that specifies a MAP opcode.

As discussed above, service selection may be based on an application identifier in the message received by the SG node 300. For instance, in one embodiment of the present invention, all GSM MAP UpdateLocation messages (opcode=2) received by the SG 300 may be directed to a global title translation application for HLR address translations. By using application identifiers, service selection is more universally applicable than conventional service selection applications that rely solely on SCCP layer parameters and/or the TCAP protocol type.

Table 3 shown below illustrates the structure of an ANSI TCAP message containing an invoke component. In the TCAP protocol, the invoke component consists of fields used to invoke a particular operation at the TCAP destination.

TABLE 3

ANSI TCAP Structure

Package Type Identifier
Total TCAP Message Length
Transaction ID Identifier
Transaction ID Length
Transaction IDs
Component Sequence Identifier
Component Sequence Length
Component Type Identifier
Component Length
Component ID Identifier
Component ID Length
Component IDs
Operation Code Identifier
Operation Code Length
Operation Code
Parameters In Table 3, the invoke component includes the fields from the component type identifier through the parameters. The invoke component also includes an operation code. As stated above, the operation code may identify the message type carried by the TCAP message. Exemplary MAP opcodes that may be of interest to the present invention are described above with respect to Table 2. By decoding the operation code, service selection function 324 can determine the type of routing address translation to be performed for a received message.

Once the appropriate service has been selected, the routing address translation may be performed using the global title address stored in the SCCP called party address or digits present in the TCAP part of a message. For IS-41 MAP messages, digits used for routing address translations may be stored in the parameter set field of the TCAP message as indicated above in Table 3.

Figure 5:
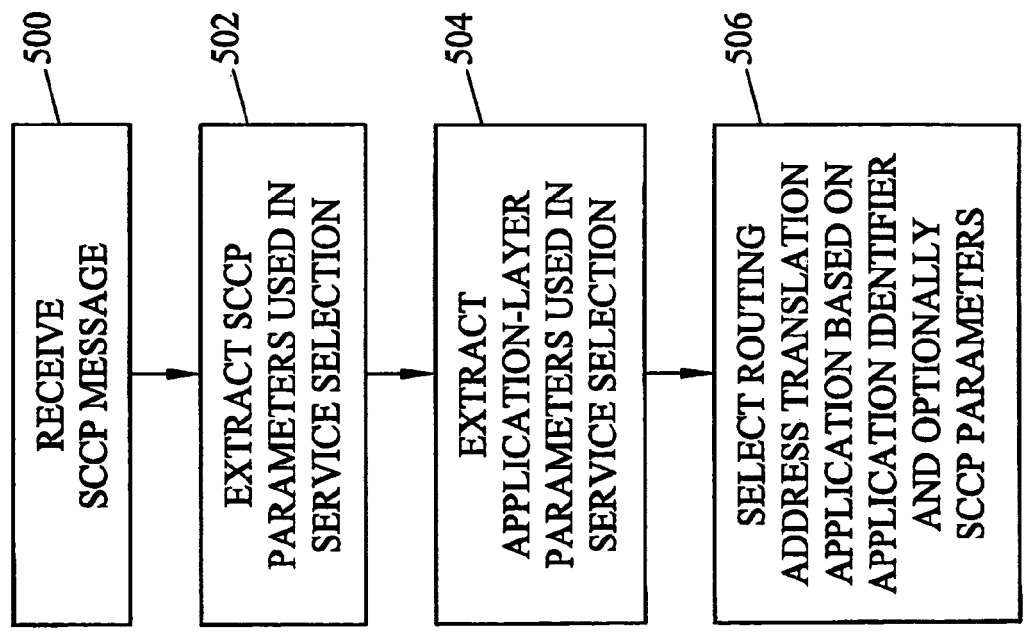
FIG. 5 is a flow chart illustrating exemplary steps for universal, automatic service selection according to an embodiment of the present invention.

FIG. 5 is a flow chart illustrating exemplary steps that may performed by service selection function 324 in performing universal, automatic service selection according to an embodiment of the present invention. Referring to FIG. 5, in step 500, service selection function 324 receives an SCCP message. In step 502, service selection function 324 extracts the SCCP parameters to be used in service selection.

As illustrated in FIG. 4, the SCCP parameters that may be used in service selection include the GTI, the TT, the SSN, the RI, the NP, and the NAI. In step 504, service selection function 324 extracts application layer parameters that may be used in service selection. The application layer parameters may include an application identifier that identifies an application layer message type. As illustrated in FIG. 4, the application identifier may include the TCAP opcode or other parameters used to identify the application layer message type. In step 506, service selection function 324 selects a routing address translation application for processing the message based on the application identifier and optionally the SCCP parameters.

Because service selection function 324 may perform service selection based on an application identifier that identifies an application layer message type, service selection function 324 is capable of performing intelligent service selection in networks where the translation type is ignored or always set to the same value. In addition, service selection function 324 is capable of intelligently selecting the appropriate routing address translation service, even when messages are received from networks that use different or non-standard SCCP service selection values.

Communication Module Based Service Selection

Figure 6:
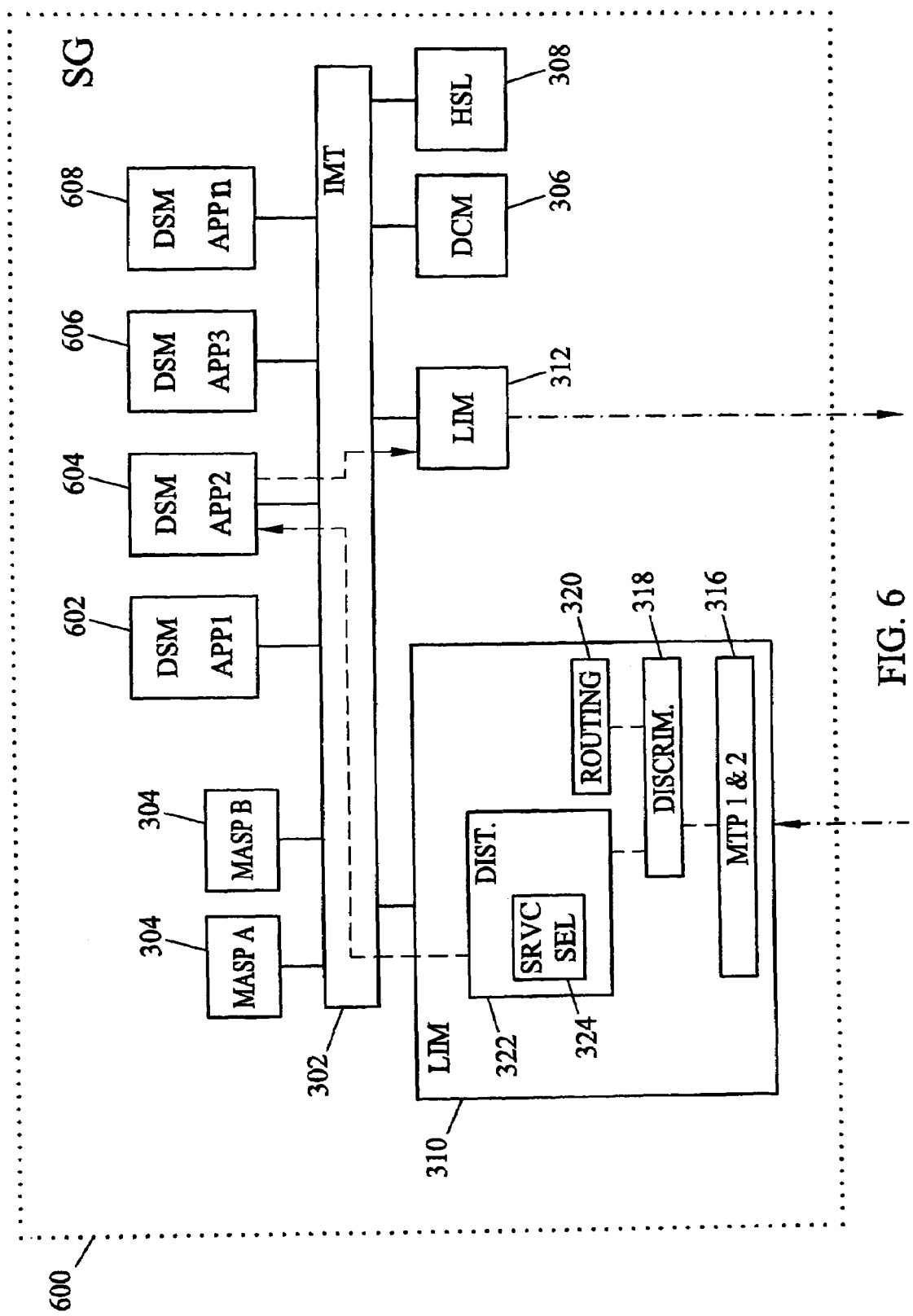
FIG. 6 is a block diagram of a routing node including a communications module for performing universal, automatic service selection according to an embodiment of the present invention.

FIG. 6 illustrates an alternate embodiment of the present invention where service selection functionality is resident on some or all communications modules in SG 300. As used herein, the term "communications module" refers to a processor card that interfaces with external signaling links, such as SS7 or IP signaling links. In FIG. 6, SG 600 is similar in architecture SG node 300 described above with respect to FIG. 3. One difference between the two embodiments is associated with where service selection processing occurs once a signaling message has entered the SG node. In the embodiment described above with respect to FIG. 3, service selection is preformed on a DSM, which does not interface directly with external signaling links. In the present embodiment, service selection is performed on a communications module, which interfaces with external signaling links. In FIG. 6, SG node 600 includes a plurality of DSMs 602–608. Each DSM may support a different routing address translation application. For example, DSM 602 may perform GTT for HLR queries, DSM 604 may perform LNP translations, DSM 608 may perform GTT for CNAM queries, and DSM 608 may perform default GTT for SCCP messages that do not match one of the service types corresponding to DSMs 602–606. In this embodiment, service selection may thus involve selecting the appropriate DSM for performing the routing address translation.

As indicated in FIG. 6, in addition to the functions described above with respect to a LIM, LIM 310 includes a service selection function 324. Service selection function 324 may receive a signaling message, such as an SCCP message 400, from discrimination function 318 and select the appropriate application located on one of DSMs 602–608 to perform the routing address translation. Service selection function 324 in FIG. 6 may use data similar to that described above to determine a service identifier associated with the service for performing a routing address translation for a received SCCP message. The selected service identifier may then be used to select an available DSM processor that is configured to support the appropriate routing address translation processing.

In the embodiment illustrated in FIG. 6, application identifiers may be mapped to various application location identifiers in a distribution table accessible by distribution function 322. Exemplary application identifier mappings are shown below in Table 4. The location identifiers may include internal communication bus addresses, logical identifiers, memory addresses, physical addresses, IP addresses, and SS7 network addresses. The sample identifiers presented in Table 4 are IMT card slot addresses. For example, if the lookup in the service selection table results in an application ID of APP2, which corresponds to LNP translations, the result of the lookup in Table 4 will be the card address 1206 of DSM 604.

TABLE 4

| Distribution Data Distribution Table | |
|---|---|
| Service | Location ID |
| APP1 (GTT for HLR) | 1205 (DSM 602) |
| APP2 (LNP) | 1206 (DSM 604) |
| APP3 (GTT for CNAM) | 1207 (DSM 606) |
| APP4 (Default GTT) | 1208 (DSM 608) |

Once a particular routing translation application has been selected by LIM 310, the signaling message is distributed to the appropriately provisioned DSM 604, which resides at IMT bus address 1206. Routing address translation processing is performed by DSM 604 in a manner similar to that described above, and the translated message is routed via LIM 312 to the specified destination.

Service Selection Module

Figure 7:
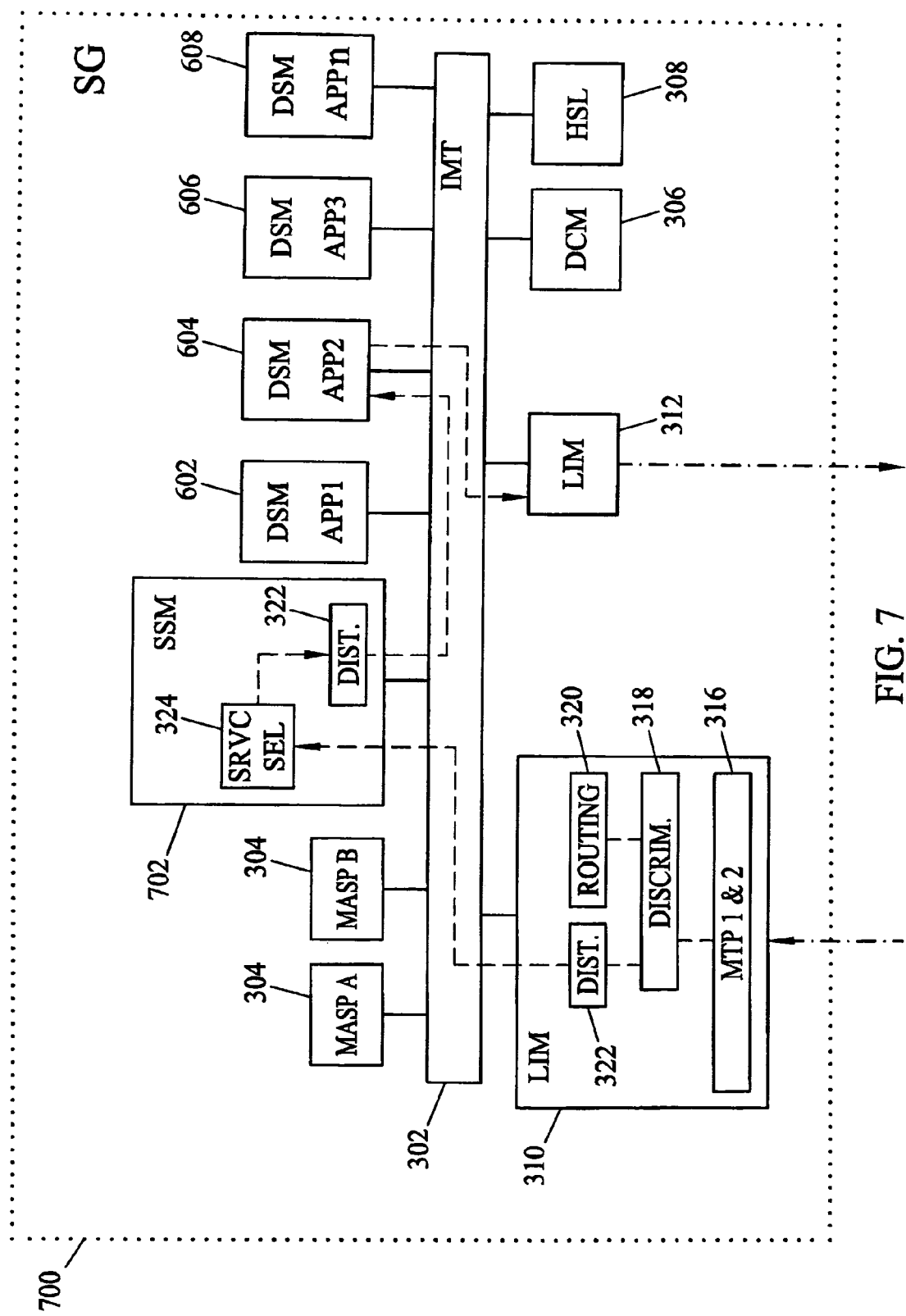
FIG. 7 is a block diagram of a routing node including a service selection module for performing universal, automatic service selection according to an embodiment of the present invention.

FIG. 7 illustrates another embodiment of the present invention, which combines features of the two embodiments described above. In FIG. 7, SG routing node 700 is similar in architecture to the systems described with regard to FIGS. 3 and 6. However, in FIG. 7, SG routing node 700 includes a service selection module 702 separate from the LIMs and DSMs for performing service selection functions. Service selection module 702 may include a service selection function 324 for performing universal, automatic service selection, as described above. In addition, service selection module 702 may include a distribution function 318 for distributing messages to the DSM associated with the appropriate routing address translation service.

In the embodiment illustrated in FIG. 7, LIM 310 may receive a signaling message, such as an SCCP message 400 and determine that the message may require processing by a routing address translation application. For example, such a determination may be made at LIM 310 through examination of the SI parameter in the received signaling message. If the SI parameter value is 3, LIM 310 may determine that further processing is required. In such a case, LIM 310 may distribute the signaling message to SSM 702. The message may then be received by SSM 702. Service selection function 324 may examine various parameters contained in the message and, using information similar to that illustrated in Table 3 above, determine that processing of the message by routing address translation application service APP2 is required.

The selected service identifier may be used to select an available DSM processor that is configured to support APP2 routing address translation processing. Application processor identifier mappings similar to those shown above in Table 4 may be used by SSM 702 to distribute the signaling message to DSM 604, which resides at IMT bus address 1206. Routing address translation processing may then be performed by DSM 604. After routing address translation, the message may then be routed via LIM 312 to its intended destination.

Thus, by performing universal, automatic service selection based on application identifiers, the present invention provides a more robust solution than conventional service selection functions that rely solely on SCCP selection parameters and/or the TCAP protocol type. A service selection function according to the present invention examines an application identifier and optionally SCCP parameters to select the appropriate routing address translation service. Since many of these parameters are standardized for other purposes, such as application layer operations, service providers are required to use particular operation codes to invoke particular operations by applications. The service selection function of the present invention uses these parameters to select a routing address translation service. Performing service selection based on application layer parameters alone or in combination with SCCP parameters increases the efficiency of routing address translation service and increases the likelihood that messages will be sent to the appropriate routing address translation application and routed to the correct destination.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for universal, automatic routing address translation service selection, the method comprising:
    (a) receiving a signaling connection control part (SCCP) message carrying a transaction capabilities application part (TCAP) message and an application layer message;
    (b) selecting, based on an application identifier associated with the application layer message and from a plurality of different routing address translation services for performing address translations for different types of messages, a routing address translation service for the SCCP message, wherein the application identifier comprises a parameter in the application layer message that identifies a type of the application layer message; and
    (c) communicating the SCCP message to an application corresponding to the selected routing address translation service.

2. The method of claim 1 wherein receiving an SCCP message includes receiving an SCCP message including a translation type and wherein selecting a routing address translation service for the SCCP message includes selecting the routing address translation service without using the translation type.

3. The method of claim 1 wherein receiving an SCCP message includes receiving an SCCP message including a translation type and wherein selecting a routing address translation service for the SCCP message includes selecting a routing address translation service using the translation type in addition to the application identifier.

4. The method of claim 1 wherein the application identifier comprises an operation code parameter in the TCAP message.

5. The method of claim 1 wherein selecting a routing address translation service for the SCCP message includes selecting the routing address translation service based on non-translation-type SCCP parameters in addition to the application identifier.

6. The method of claim 5 wherein selecting a routing address translation service based on non-translation-type SCCP parameters includes selecting the routing address translation service based on at least one of a global title indicator, a domain type, a numbering plan, a nature of address indicator, and a subsystem number in the SCCP message.

7. The method of claim 1 wherein selecting a routing address translation service based on the application identifier includes examining the application layer message to determine the application layer message type.

8. The method of claim 7 wherein the application layer message comprises an IP telephony signaling layer and wherein the application identifier is located in the IP telephony signaling layer.

9. The method of claim 1 wherein receiving an SCCP message includes receiving an SCCP message encapsulated in an Internet Engineering Task Force signaling transport (IETF SIGTRAN) layer and wherein the application identifier is located in the IETF SIGTRAN layer.

10. The method of claim 1 wherein selecting a routing address translation service includes selecting a routing address translation database for performing the routing address translation service.

11. The method of claim 1 wherein selecting a routing address translation service includes selecting a routing address translation service from a plurality of different routing address translation services.

12. The method of claim 1 wherein steps (a)–(c) are performed at a signal transfer point.

13. The method of claim 1 wherein steps (a)–(c) are performed at a signaling system number 7/Internet protocol (SS7/IP) gateway.

14. The method of claim 1 wherein the routing address translation service comprises a global title translation service.

15. The method of claim 1 wherein the routing address translation service includes a mobile number portability routing address translation service.

16. The method of claim 1 wherein the routing address translation service includes a global title translation service for routing mobile call signaling messages to a service entity in a network that includes multiple service entities, wherein the service entities include at least one of home location registers (HLRs), service control points (SCPs), short message service (SMS) servers, short message service centers (SMSCs), and short message point to point (SMPP) gateways.

17. The method of claim 1 wherein the plurality of different routing address translation services includes a plurality of different global title translation services.

18. The method of claim 1 wherein the plurality of different routing address translation services includes a number portability translation service.

19. The method of claim 1 comprising translating an address in the SCCP message to a rotatable destination address and routing the SCCP message to a destination corresponding to the routable destination address.

20. A method for universal, automatic routing address translation service selection, the method comprising:

(a) receiving a signaling message including a signaling connection control part (SCCP) component and an application layer component;

(b) decoding, from the message, an application layer parameter associated with the application layer component of the message; and (c) selecting, based on the application layer parameter and from a plurality of different routing address translation applications for performing address translations for different types of messages, an SCCP routing address translation application for translating an address associated with the SCCP component into a routable destination address, wherein the application layer parameter comprises an application identifier that identifies a message type of the application layer component.

21. The method of claim 20 wherein receiving a message including an SCCP component and an application layer component includes receiving an SCCP message including a TCAP component carrying the application layer component and wherein selecting an SCCP routing address translation application based on the application layer component includes selecting an SCCP routing address translation application based on a TCAP opcode identifying the type of the application layer component.

22. The method of claim 20 wherein receiving a message including an SCCP component and an application layer component includes receiving an SCCP message including a mobile application part (MAP) component and wherein selecting an SCCP routing address translation application based on the application layer component includes selecting an SCCP routing address translation application based on a MAP message type.

23. The method of claim 20 wherein selecting an SCCP routing address translation application based on the application layer parameter includes selecting an SCCP routing address translation application based on parameters extracted from the application layer component in combination with parameters extracted from the SCCP component.

24. The method of claim 20 wherein selecting an SCCP routing address translation application includes selecting an SCCP routing address translation application without using the translation type.

25. The method of claim 20 wherein steps (a)–(c) are performed at a signal transfer point.

26. The method of claim 20 wherein steps (a)–(c) are performed at signaling system number 7/Internet protocol (SS7/IP) gateway.

27. The method of claim 20 wherein selecting an SCCP routing address translation application includes selecting an SCCP routing address translation application from a plurality of different routing address translation applications.

28. The method of claim 20 wherein the plurality of different routing address translation applications includes a plurality of different global title translation applications.

29. The method of claim 20 wherein the plurality of different routing address translation applications includes a number portability translation application.

30. The method of claim 20 comprising translating the address associated with the SCCP component into a routable destination address and routing the signaling message to a destination corresponding to the routable destination address.

31. A method for universal, automatic service selection, the method comprising:

(a) receiving a signaling message including a signaling connection control part (SCCP) component, a transaction capabilities application part (TCAP) component, and a mobile application part (MAP) component;

(b) decoding the TCAP component to determine a MAP message type;

(c) selecting, from a plurality of different routing address translation applications for performing address translations from different types of messages, a routing address translation application for the SCCP component based on the MAP message type.

32. The method of claim 31 wherein decoding the TCAP component to determine the MAP message type includes extracting the TCAP opcode to determine the MAP message type.

33. The system of claim 31 comprising determining whether the MAP message is of the Interim Standard-41 (IS-41) or global system for mobile communications (GSM) MAP protocol and analyzing the TCAP opcode based on the MAP protocol type.

34. The method of claim 31 wherein performing steps (a)–(c) includes performing steps (a)–(c) at a signal transfer point.

35. The method of claim 31 wherein performing steps (a)–(c) at a signaling system number 7/Internet protocol (SS7/IP) gateway.

36. The method of claim 31 wherein the plurality of different routing address translation applications includes a plurality of different global title translation applications.

37. The method of claim 31 wherein the plurality of routing address translation applications includes a number portability translation application.

38. The method of claim 31 comprising determining a routable destination address for the signaling message using the selected routing address translation application and routing the signaling message to a destination associated with the routable destination address.

39. A signaling message routing node including a universal, automatic service selection application, the signaling message routing node comprising:

(a) a communications module for sending and receiving telecommunications signaling messages to and from telecommunications signaling links and for selecting a signaling connection control part (SCCP) message from the telecommunications signaling messages for further processing, the SCCP message carrying an application layer message;

(b) a routing address translation services module operatively associated with the communications module for performing a routing address translation for the SCCP message based on one or more parameters in the SCCP message, wherein the routing address translation services module includes a plurality of different routing address translation applications for performing routing address translations for different types of messages; and (c) a service selection application operatively associated with the communications module and the routing address translation services module for selecting, based on an application identifier associated with the application layer message and from the plurality of different routing address translation services, a routing address translation service the SCCP message based on an application identifier associated with the application layer message, wherein the application identifier comprises a parameter in the application layer message that identifies a type of the application layer message.

40. The signaling message routing node of claim 39 wherein the application identifier comprises a parameter in the application layer message.

41. The signaling message routing node of claim 39 wherein the application identifier comprises an application layer parameter stored in a TCAP message carried by the SCCP message.

42. The signaling message routing node of claim 41 wherein application identifier comprises an operation code in the TCAP message.

43. The signaling message routing node of claim 39 wherein the service selection application is adapted to select the routing address translation application based on at least one of a subsystem number, a translation type, a numbering plan, a domain type, and a nature of address indicator associated with the SCCP message.

44. The signaling message routing node of claim 39 wherein the service selection application is adapted to select the routing address translation application based on a combination of SCCP and application layer parameters associated with the SCCP message.

45. The signaling message routing node of claim 44 wherein the combination of SCCP and application layer parameters includes the translation type.

46. The signaling message routing node of claim 44 wherein the combination of SCCP and application layer parameters does not include the translation type.

47. The signaling message routing node of claim 39 wherein the service selection application is adapted to select the location of a global title translation database for performing the routing address translation.

48. The signaling message routing node of claim 39 wherein the service selection application is located on the communications module.

49. The signaling message routing node of claim 39 wherein the service selection application is located on the routing address translation services module.

50. The signaling message routing node of claim 39 comprising a service selection module separate from the communication module and the routing address translation services module, wherein the service selection application is located on the service selection module.

51. The signaling message routing node of claim 39 comprising a plurality of routing address translation services modules corresponding to a plurality of different routing address translation services, wherein the service selection application is adapted to select a routing address translation service corresponding to one of the routing address translation services modules.

52. The signaling message routing node of claim 39 wherein the plurality of different routing address translation applications includes a plurality of different global title translation applications.

53. The signaling message routing node of claim 39 wherein the plurality of different routing address translation applications includes a number portability translation application.

54. The signaling message routing node of claim 39 wherein the selected routing address translation application is adapted to translate an address in the SCCP message to a routable destination address and wherein the signaling message routing node further comprises a routing function for routing the SCCP message to a destination corresponding to the routable destination address.

* * * * *